United States Patent
Rumpf et al.

(10) Patent No.: US 7,431,909 B1
(45) Date of Patent: Oct. 7, 2008

(54) PROCESS FOR PRODUCTION OF CARBON BLACK

(75) Inventors: Frederick H. Rumpf, Billerica, MA (US); Roscoe W. Taylor, Ayer, MA (US); Alvin E. Toombs, Phippsburg, ME (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/857,490

(22) PCT Filed: Dec. 3, 1999

(86) PCT No.: PCT/US99/28756

§ 371 (c)(1),
(2), (4) Date: Oct. 1, 2001

(87) PCT Pub. No.: WO00/32701

PCT Pub. Date: Jun. 8, 2000

Related U.S. Application Data

(60) Provisional application No. 60/111,011, filed on Dec. 4, 1998, provisional application No. 60/111,005, filed on Dec. 4, 1998.

(51) Int. Cl.
*C09C 1/50* (2006.01)
(52) U.S. Cl. .................. 423/449.1; 423/450
(58) Field of Classification Search .......... 423/449.1, 423/450
See application file for complete search history.

(56) References Cited

U.S. PATENT DOCUMENTS

| | | | |
|---|---|---|---|
| 2,564,736 A | 8/1951 | Stokes | |
| 2,672,402 A | 3/1954 | Stokes | |
| 2,796,332 A | 6/1957 | Pollock | 23/209.6 |
| 3,438,732 A * | 4/1969 | Roger | 423/450 |
| 3,645,685 A | 2/1972 | Crouch | 23/209.4 |
| 4,101,639 A | 7/1978 | Surovikin et al. | 423/449 |
| 4,315,894 A | 2/1982 | Austin | 422/151 |
| 4,393,034 A | 7/1983 | Smith | 423/450 |
| 4,636,375 A * | 1/1987 | Rothbuhr et al. | 423/449.1 |
| 4,690,695 A * | 9/1987 | Doshi | 55/16 |
| 5,240,472 A * | 8/1993 | Sircar | 95/52 |
| 5,486,674 A | 1/1996 | Lynum et al. | 219/121.52 |
| 5,527,518 A | 6/1996 | Lynum et al. | |
| 5,725,616 A | 3/1998 | Lynum et al. | 48/127.3 |

* cited by examiner

*Primary Examiner*—Stuart Hendrickson

(57) ABSTRACT

Off-gas from a carbon black furnace is employed as a combustion gas feed stream to the burner or combustion zone of the same or a different carbon black furnace in accordance with certain embodiments, suitable conduit and valving is provided to pass off-gas, from which carbon black has been substantially removed, from any or all of multiple different carbon black furnaces to the burner. The off-gas is heated, preferably by plasma heating, and dewatered. Carbon dioxide stripping or rather stripping of gas components from the dewatered heated off-gas is found to be unnecessary to achieve economically favorable use of off-gas recirculation.

1 Claim, 1 Drawing Sheet

PROCESS FOR PRODUCTION OF CARBON BLACK

CROSS-REFERENCE TO RELATED APPLICATIONS

This application is the Section 371(c) filing of copending PCT Application No. PCT/US99/28756 filed 3 Dec. 1999, which designated the United States. This application also claims domestic priority from the following copending and commonly owned provisional applications, U.S. Ser. No. 60/111,005, filed 4 Dec. 1998, and U.S. Ser. No. 60/111,011, filed 4 Dec. 1998.

The present invention relates to methods and apparatus for producing carbon black. In particular, the invention may be used for the production of various types or grades of carbon black suitable for use in manufacturing rubber articles, such as tires, etc., in polygraphy, electronics and cable coatings, in the production of varnishes and paints, including use applications in which reinforcing and/or pigmentary properties of carbon black are required.

BACKGROUND

Various different processes or techniques are known in the art for producing carbon black. One such process, sometimes referred to as a furnace carbon black producing process, employs a furnace having a burner or combustion chamber followed by a reactor. A combustion gas feed stream, typically a hydrocarbon gas stream such as natural gas, or the like, is combusted in the burner portion of the furnace along with an oxidant feed gas stream such as air or oxygen, to produce hot combustion gases which pass then to the reactor portion of the furnace. In the reactor, hydrocarbon feedstock is exposed to the hot combustion gases. Part of the feedstock is burned, while the rest is decomposed to carbon black. The reaction products typically are quenched to a temperature of about 230° C., whereupon the carbon black content is collected by any of various conventional methods. It is widely recognized that the furnace carbon black process does not operate at desirable efficiency levels. Employing air and natural gas as the feedstreams to the burner, efficiency typically would not exceed sixty percent (60%) for a lean burn operation, that is, an operation in which the natural gas is feed at less than stoichiometric amount relative to the oxygen content of the air feed stream.

It is desirable to have the hot combustion gases produced in the burner at temperatures sufficiently high to effect efficient pyrolysis of the hydrocarbon feedstock, also referred to as the "make hydrocarbon" to produce carbon black, while not having the temperature of the combustion gases excessively high, which could cause damage to the refractory lining of the combustion zone and/or the reaction zone. Operating at nearly stoichiometric conditions, with feed rates high enough to meet throughput requirements and other necessary operating conditions may produce excessively high temperatures. Operating under fuel rich conditions, that is, employing an excess of the natural gas relative to the air or other oxidant gas stream, may produce tolerable combustion gas temperatures coupled with improved yield, even yield in excess of sixty percent (60%). Under such operating conditions, however, it has been found that the raw material costs generally are uneconomically high. Accordingly, it is typical to operate under a fuel lean combustion strategy to achieve adequate throughput and tolerable raw material costs, notwithstanding the resultant low carbon black yield.

The off-gas or tailgas produced along with the carbon black, due to the nature of the furnace carbon black producing process, has long be recognized to have significant energy value. In a furnace carbon black producing process, tailgas from the reactor filter system, that is, tailgas from which the carbon black has been removed, typically contains combustible gas components. It has long been recognized to be highly desirable to exploit the energy content of such off-gas. It has been used, for example, to preheat the combustion gas feed streams to the burner in a furnace carbon black producing process. It has also been used to preheat the hydrocarbon feedstock fed to the reactor. In addition, the tailgas from a furnace carbon black producing process has been burned to operate a generator to produce electricity for use at the carbon black production facility or for export.

It has also been suggested to use such tailgas as all or part of the combustion gas feed stream fed with the oxidant gas feed stream to the burner in a furnace carbon black producing process that is, it has been suggested to exploit the energy connect of the off-gas by combusting it with an oxidant gas feed stream in the combustion chamber of a carbon black furnace to produce combustion gases for the pryolysis of the hydrocarbon feedstock. Numerous problems are encountered, however, in attempting to produce carbon black by the combustion of such furnace off-gas, including problems in controlling the temperature of the combustion gases, oxygen content of the combustion gases and flow rate of the combustion gases. Such problems have resulted in little if any commercial implementation of furnace carbon black producing processes employing furnace off-gases as a combustion gas feed stream to the same or a different carbon black producing furnace. Exemplary of such prior attempts are U.S. Pat. No. 2,796,332 to Pollock, wherein off-gas is recirculated from a carbon black furnace to its own combustion chamber. The tailgas is preheated and treated for the removal of carbon dioxide. The removal of carbon dioxide adds cost and complexity to the production process. In U.S. Pat. No. 4,261,964 to Scott TV et al, hydrogen gas and carbon monoxide gas are stripped from carbon black furnace off-gas and used to replace natural gas fed to the combustion chamber of the same furnace. In U.S. Pat. No. 3,645,685 to Crouch, carbon black furnace off-gas is recirculated to the reactor portion of the same furnace. In U.S. Pat. No. 4,315,894 to Austin, off-gas from the same or other carbon black furnace is used as a quench fluid. Typically the off-gas in such prior teachings is employed in a fuel lean combustion strategy, seemingly following the fuel lean strategy typically employed when natural gas or other high BTU content combustion gas is employed. U.S. Pat. No. 4,393,034 to Smith is exemplary of this, employing dewatered off-gas in a fuel lean combustion strategy.

It is an object of the present invention to overcome some of the problems encountered in past attempts to employ off-gas from a furnace carbon black producing process as a combustion gas feed stream to the combustion zone of a carbon black furnace. It is a particular object of the invention to provide a commercially feasible use of off-gas from a furnace carbon black producing process as a combustion gas to the burner of the same or a different carbon black furnace operating a furnace carbon black producing process.

SUMMARY

In accordance with a first aspect, off-gas from a furnace carbon black producing process is employed as a combustion gas feed stream to the combustion zone of the same or a different furnace carbon black producing process. The term "recirculation" or "off-gas recirculation" or the like is used here to mean feeding the furnace off-gas to the combustion zone of the same or a different carbon black producing furnace, unless the context specifies otherwise. In this regard, in accordance with certain preferred embodiments of the invention, off-gas from one carbon black furnace is used as a combustion gas feed stream in a second furnace. The energy value of the tailgas depends in large part on the grade of carbon black being produced by the furnace. Accordingly, it will be economically advantageous in certain embodiments to employ the highest heat value off-gas available from amongst multiple different carbon black furnaces. In accordance with one aspect of the invention, suitable conduit and valving is provided to pass off-gas (from which the carbon black has been substantially removed) from any one or more of multiple different carbon black furnaces to the combustion gas feed inlet of a carbon black furnace. The selection of off-gases from the different furnaces can be changed from time-to-time, as appropriate, to always employ the most suitable off-gases available. By providing the option of selected and mixing off-gas from multiple different carbon black furnaces, significantly improved production flexibility and economics can be achieved as the particular grade of carbon black being produced at the various different furnaces changes from time-to-time with consequent changes in the energy value of the off-gas.

In accordance with another aspect, a furnace carbon black producing process employs off-gas from the same or a different carbon black furnace, which off-gas has been dewatered and heated, and is employed in a fuel rich combustion strategy. It has now been found that economic use of off-gas recirculation can be achieved by this combination of features. The cost of stripping carbon dioxide or other gases from the off-gas can be avoided, thereby further facilitating the achievement of economical off-gas recirculation. References here and below to off-gas recirculation as a combustion gas should be understood to mean off-gas from which substantially all of the carbon black has been removed.

In accordance with another aspect, a furnace carbon black producing process is operated with off-gas from the same or a different carbon black furnace, under a deep fuel rich combustion strategy. In particular, the amount of oxident gas feed stream which is combined with the combustion gas feed stream is less than eighty percent (80%) of the amount required to completely combust the combustible components of such combustion gas feed stream. Preferably, such radically fuel rich combustion strategy employs off-gas as described immediately above. That is, it employs heated, dewatered off-gas from which the carbon black has been substantially removed. Enhanced cost advantages are found to be achieved by not stripping carbon dioxide or other gases from the heated, dewatered off-gas.

In accordance with yet another aspect, a furnace carbon black producing process is operated with plasma heating. In accordance with certain preferred embodiments, plasma heating is employed to preheat a combustible fuel feed stream to the burner. The combustible fuel can be off-gas from the same or different carbon black furnaces, which is plasma heated prior to using such off-gas as a combustion gas feed stream. In accordance with certain preferred embodiments, plasma heating is employed to preheat the oxidant gas feed stream to the burner. In accordance with certain embodiments, plasma heating is used to preheat the make hydrocarbon feedstock. In accordance with certain embodiments, plasma heating is employed to preheat two or more of these feed streams. In accordance with certain preferred embodiments, plasma heating is employed to raise the temperature of the combustion gases produced in the burner as they are passed to the reactor. Plasma heating can be accomplished in accordance with methods known to those skilled in the art. A plasma torch can be employed generally in accordance with the principles disclosed in U.S. Pat. No. 5,725,616 to Lynum et al, the entire disclosure of which is hereby incorporated by reference, and in accordance with the disclosure of U.S. Pat. No. 5,486,674, to Lynum the entire disclosure of which also incorporated herein by reference. In addition, other principles of using plasma heating in connection with carbon black production are disclosed in U.S. Pat. No. 4,101,639 to Surovikin et al, the entire disclosure is hereby incorporated by reference.

In accordance with another aspect, a furnace carbon black producing process employs a deep fuel rich combustion strategy, that is, employing an oxidant gas stream supplying less than eighty percent (80%) of stoichiometric oxygen, wherein the combustible gas feed stream to the combustion zone of the furnace is substantially entirely off-gas from the same and/or a different carbon black furnace, and wherein such off-gas (from which the carbon black has been substantially removed) is dewatered and preheated by means of plasma heating, and the oxidant gas stream is air, optionally being oxygen enhanced.

In accordance with another aspect, carbon black is produced, optionally with plasma heating, by a fuel rich recirculation process employing control means comprising sensor means for monitoring the combustion value of the off-gas being fed to the combustion chamber or burner of the carbon black furnace. Such control means preferably further comprises combustion control means, e.g., flow control means responsive to a control signal generated by the sensor means corresponding to the combustion value, for adjusting the feed ratio of the off-gas and/or the feed ratio of the oxidant feed stream. In accordance with certain preferred embodiments to the flow control means controls the feed rate of enhancement oxygen to the burner. Suitable sensor means include commercial available apparatus which will be readily apparent to those skilled in the art given the benefit of this disclosure. Preferred sensor means comprise a commercially available Wobbie Meter. In accordance with certain preferred embodiments the control means comprises temperature sensor means for sensing combustion temperature in the burner and/or in the reactor of the carbon black furnace, and combustion control means for adjusting combustion parameters in response to a temperature control signal from the temperature sensor. Suitable combustion control means for use with the temperature sensor include, for example, flow control means as described above. Suitable commercially available temperature sensor means includes an Infraview Pyrometer.

Additional features and advantages of the present invention will become apparent to those skilled in the art from the present disclosure, including the following detailed description of certain preferred embodiments.

DETAILED DESCRIPTION OF CERTAIN PREFERRED EMBODIMENTS

Figure 1:
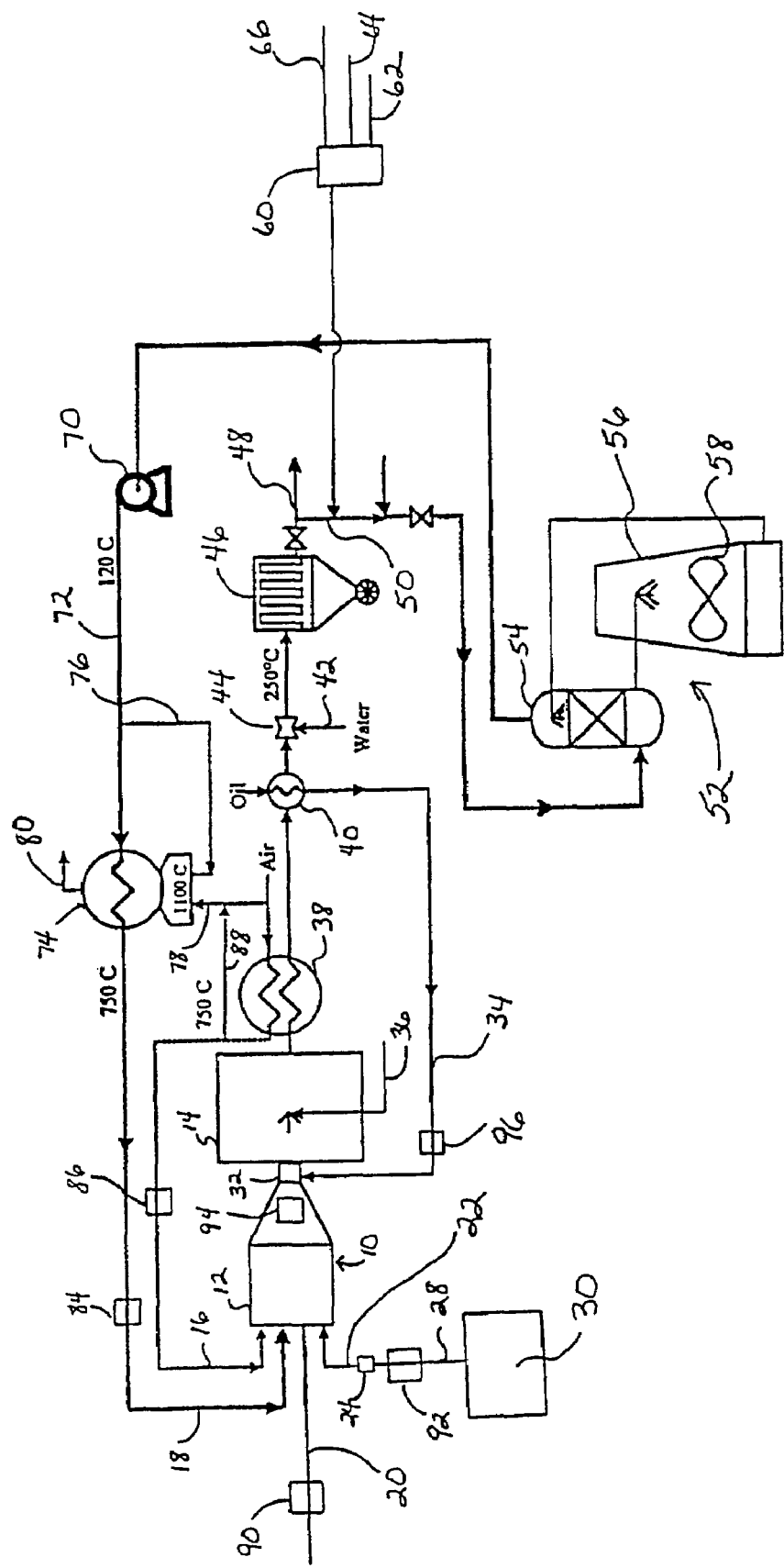
FIG. 1 is a schematic diagram of a furnace carbon black producing process in accordance with the present invention.

The following detailed description of certain preferred embodiments will illustrate various aspects of the inventive subject matter disclosed herein, as well as principles of operation regarding such inventive subject matter. With benefit of the foregoing disclosure and the following detailed description, numerous alternative and modified applications of the inventive subject matter will be apparent to those skilled in the art.

Referring now to FIG. 1, a furnace carbon black producing process and apparatus are illustrated in accordance of certain aspects of the present invention, including certain optional elements in accordance with preferred embodiments. Carbon black furnace 10 is seen to comprise burner portion 12 and reactor portion 14. Burner portion 12 is fitted with gas feed ports to received an oxidant gas feed stream, specifically, combustion air via feed line 16, a combustion gas feed stream, which in the embodiment illustrated in FIG. 1 is off-gas via feed line 18 from furnace 10 and/or one or more other carbon black furnaces as discussed further below, optional supplementary combustion fuel via feed line 20 for feeding, for example, natural gas, oil, etc., and oxygen enhancement feed stream via feed line 22. Valve 24 in feed line 22 is adapted to control the oxygen enrichment flow via feed line 28 from oxygen source 30. Oxygen source 30 preferably operates a pressure-swing adsorption ("PSA") process in view of its relatively low operating costs for producing enrichment oxygen for the oxidant gas feed stream. Optionally, supplementary oxygen via feed line 22 is mixed with combustion air in feed line 16 rather than being fed separately into combustion chamber 12.

The hot combustion gases produced in burner 12 are feed to reactor 14 through passage 32. Make hydrocarbon feedstock is fed via feed line 34 to passage 32, whereupon it is carried by the hot combustion gases into reactor 14 and there converted into carbon black and off-gas. Optionally, quench water is fed at an appropriate downstream location in reactor 14 via quench water feed line 36. Carbon black laden off-gas passes from reactor 14 through heat exchanger 38 in which it is cooled, preferably by preheating combustion air fed to the burner via line 16. The off-gas, still laden with carbon black, preferably passes through a second heat exchanger 40 in which it is further cooled by heat transfer to hydrocarbon feedstock fed to furnace 10 via feed line 34. Optionally, additional water is added to the off-gas via feed line 42 at valve 44. Carbon black is removed by carbon black filter housing 46 or other suitable carbon black removal means well-known to those skilled in art. The off-gas, now being cooled, and from which the carbon black has been substantially removed, can be passed to further processing and other uses via feed line 48, or in the alternative, can be passed via feed line 50 to further processing in accordance with the present invention. Specifically, off-gas feed line 50 passes to dewatering equipment 52. In the preferred embodiment illustrated, dewatering equipment 52 comprises packed column of spray tower 54 and cooling tower 56 equipped with fan 58 in accordance with known designs and cooling techniques. Optionally, a second dewatering unit is employed to further dewater the off-gas prior to passing the off-gas to pump 70 or heat exchanger 74. Alternative dewatering processes and apparatus will be readily apparent to those skilled in the art in view of the present disclosure, including, for example, fin fan coolers, alternative heat exchanges, etc.

In accordance with an optional aspect of the invention, certain highly preferred embodiments employ valving 60 adapted to selectively feed off-gas from one or more other carbon black furnaces to the burner 12 of carbon black furnace 10. Thus, off-gas from other carbon black furnaces optionally may be used as a combustion gas feed stream to burner 12 either together with or in lieu of off-gas from furnace 10. As seen in FIG. 1, valving 60 has off-gas feed lines 62, 64 and 66 carrying off-gas from a second, third, and fourth carbon black furnaces, respectively. Such off-gas from other carbon black furnaces is treated in accordance with the present disclosure. That is, carbon black would be substantially removed therefrom and it would be dewatered. Further, it would be heated as now described with further reference to FIG. 1. Pump 70 pumps off-gas which has been cooled and dewatered, and from which carbon black is has been substantially removed, through feed line 72 to booster heater 74. In booster heater 74 the tailgas is heated, for example to approximately 750° C. Preferably a portion of the off-gas is fed to the booster heater via feed line 76 and combustion air is feed to the booster heater via feed line 78, generating a combustion temperature typically about 1100° C. Exhaust gas from the booster heater 74 can be vented to a dryer stack via line 80. The heated, dewatered, off-gas, from which carbon black has been substantially removed, is fed to the burner or combustion chamber 12 of furnace 10, as discussed above. It is a significant advantage of the present invention, that economical use of off-gas as a combustion gas feed stream to a carbon black furnace can be accomplished if the carbon black is substantially removed therefrom, it is dewatered, and it is heated, as discussed above. Commercially acceptable economics are found to be achieved by avoiding the cost and complexity of stripping carbon dioxide or other gas components from the dewatered off-gas. Moreover, as discussed further below, in certain preferred embodiments the off-gas is used is a deep fuel rich combustion strategy. As noted above, the term "deep fuel rich" is used here to specify the highly advantageous preferred embodiments of the invention wherein off-gas is used, preferably without natural gas or other supplementary combustible gas feed streams, with an oxidant gas stream providing oxygen in an amount less than eighty percent (80%) of stoichiometric. Preferably deep fuel rich processes of the present invention are operated at fifty percent (50%) to less than eighty percent (80%) of stoichiometric oxygen, more preferably sixty-two percent (62%) to seventy-eight percent (78%). In accordance with such highly preferred embodiments, economical use of carbon black furnace off-gas is achieved together with production of commercially valuable grades of carbon black. In accordance with certain preferred embodiments, carbon black is produced using pre-heated off-gas, preferably dewatered, with a deep fuel rich combustion process at a primary combustion (PC) ratio of seventy percent (70%) to eighty percent (80%). Such preferred embodiments are found to achieve optionally lowered raw material costs.

In accordance with certain preferred embodiments, carbon black is produced using pre-heated off-gas, preferably dewatered, with a deep fuel rich combustion process at a PC ratio less than seventy percent (70%). Such preferred embodiments are found to achieve optimal product throughput at the lowest manageable PC ratio.

It is found that furnace carbon black production processes in accordance with the present invention will generate higher yields of carbon black at a given surface area, and better production economics, by preheating to the highest manageable temperature any or all reactor streams, including, for example, the air and any oxygen enhancement feed streams to the burner, any natural gas or other supplemental combustion gas feed stream, any off-gas feed stream to the burner, the combustion gases passed within the furnace from the burner to the reactor, and/or the hydrocarbon feedstock. Such supplementary heat can be obtained from a fired heater, heat exchanger, electrical elements and/or, in accordance with certain highly preferred embodiments of the invention, an electric arc or plasma heating unit. Thus, in accordance with certain preferred embodiments, plasma heating is employed to further improve economic performance of a carbon black furnace employing heated, dewatered off-gas as the combustion gas feed stream. Plasma heating most preferably is used to further heat off-gas which has been heated already to a certain degree via suitable heat exchanger means, such as a high temperature heat exchanger about to operate at or near the exit temperature of off-gas from a carbon black furnace. Referring again to FIG. 1, a plasma heating unit 84 is shown for heating off-gas in feed line 72 prior to feeding the off-gas to combustion chamber 12. Plasma heating unit 84 can be used together with or in lieu of booster heater 74. Plasma heating unit 86 is shown in feed line 16 for heating combustion air fed to combustion zone 12. In preferred embodiments of the invention employing plasma heating for heating combustion air, such plasma heating may be used either in lieu of or in addition heating via heat exchanger 38. In any event, it may be desirable to employ heat exchanger 38 for heating combustion air fed via line 88 to booster heater 74. In accordance with certain preferred embodiments, a plasma heating unit 90 may be provided for preheating of supplementary combustion gas feed stream fed via line 20 to combustion chamber 12. Also, a plasma heating unit 92 may be employed for preheating enrichment oxygen fed to combustion chamber 12 via feed line 22 and valve 24. Also, plasma heating unit 94 may be provided for further heating combustion gases passing from combustion chamber 12 to reactor 14. In accordance with certain preferred embodiments, the plasma heating unit 96 is employed to preheat make hydrocarbon feedstock fed to furnace 10 via feed line 34.

As noted above, many attempts have been made in the past to improve the economics of furnace carbon black producing processes through the use of off-gas from the same or a different furnace as combustion gas in the burner portion of the furnace. In most cases it is suggested to use off-gas in an amount up to the point of stoichiometric mixture with the oxidant gas stream. No commercially successful implementation is known, however, for using off-gas in a fuel lean combustion process. The few suggestions regarding use of off-gas in a fuel rich combustion, sometimes referred to as sub-stoichiometric, also are not known to have resulted in commercially successful processes. One such suggestion, in U.S. Pat. No. 3,645,685 to Crouch, mentioned above, suggested recycling off-gas from which carbon black had not yet been removed. In U.S. Pat. No. 4,490,346 to Cheng, it is suggested to use near stoichiometric amounts of oxidant gases, tempered by addition of diluent gas selected from air and additional off-gas. The Cheng patent teaches that the term near stoichiometric means that the amount of oxidant which is combined with the fuel gas stream is within about twenty percent (20%) of the amount required to completely combust the combustible components in the fuel gas stream. In contrast to these early unsuccessful strategies, preferred embodiments of the present invention employ dewatered, heated off-gas in a deep fuel rich combustion strategy. By deep fuel rich is meant that the amount of oxidant which is combined with the heated, dewatered off-gas stream is less than eighty percent (80%) of the amount required to completely combust the combustible components in the off-gas together with any supplementary combustible gas fed therewith to the burner portion of the carbon black furnace. In accordance with these preferred embodiments, improved economic benefit is achieved, sufficient for successful commercial implementation, through the use of a deep fuel rich combustion strategy employing solely carbon black furnace off-gases from the same or one or more different carbon black furnaces, wherein the off-gases are heated and dewatered, as disclosed and discussed above, and contain little or no carbon dioxide. In contrast to prior suggestions to undergo the cost and complexity of passing the off-gas through a process for stripping carbon dioxide prior to recycling to the burner, the deep fuel rich combustion strategy of the present invention is found to yield off-gas substantially devoid of carbon dioxide. While not wishing to be bound by theory, it is presently understood that carbon dioxide and water will oxidize the hydrocarbon feedstock, forming carbon monoxide and hydrogen. Employing off-gas in a deep fuel rich combustion strategy substantially reduces the concentration of these species in the furnace off-gas, as well as consuming substantially all of the oxygen from the combustion air and any oxygen enrichment. Consequently, employing heated, dewatered off-gas in a deep fuel rich combustion strategy is now found to substantially reduce the concentration of carbon dioxide and water and, correspondingly, substantially increase the yield of carbon black from the hydrocarbon feedstock.

Preferably the strongest available off-gas, that is, off-gas having the highest heating or energy value, is employed as the combustion gas feed stream. Typically, for example, high combustion value off-gas is obtained from a carbon black furnace producing low surface area carbon black, especially carbon black having iodine absorption number less than 60. Accordingly, certain highly preferred embodiments of the present invention employ heated, dewatered off-gas from production of low surface area carbon black as the sole combustion gas feed stream to the burner of a different carbon black furnace, in a deep fuel rich combustion strategy. Alternatively, in accordance with other preferred embodiments, a quantity of supplemental fuel, such as natural gas etc., is employed to increase the heat of combustion of the total burner fuel mixture.

In accordance with certain alternative embodiments, carbon dioxide can be stripped from the recirculated off-gas. Optionally a pressure swing absorption (PSA) unit can be employed for such stripping operation. As noted above, however, it is a significant advantage of certain preferred embodiments of the invention operated under a deep fuel rich combustion strategy, that small quantities of carbon dioxide are present in the resultant off-gas. Using such off-gas, advantageous improvement in the carbon black process is achieved without the need of carbon dioxide stripping of such off-gas.

Calculated analysis of preferred embodiments in accordance with the present invention demonstrates reduction in raw material costs (RMC) together with the good yield and desirable carbon black surface area and throughput. In general, adding heat to the combustion process, as disclosed above, is found in virtually all embodiments to improve economics of the process. Adding heat through electrical heating or a plasma arc is found to advantageously achieve higher product throughput at somewhat higher raw material costs. A series of calculated furnace carbon black producing processes is shown below in Table 1. In particular, six processes are shown, including a control process "NG" employing only natural gas as the combustion gas feed stream to the furnace burner. Also shown are five processes in accordance with the present disclosure, employing heated, dewatered off-gas from a low surface area carbon black production furnace. Four of these five employ a deep fuel rich combustion strategy with no supplementary natural gas. These four processes are listed as "DFROG-1" through "DFROG-4". The last of the five processes in accordance with the present disclosure, listed in FROG-5, employs heated, dewatered off-gas from a low surface area carbon black production furnace, again with no supplementary natural gas. All relevant process parameters were otherwise the same for the six processes compared in Table 1. In all cases, the off-gas is dewatered to five percent (5%) $H_2O$ content. The processes shown in Table 1 all were assumed to produce carbon black of grade N339. In all processes shown in Table 1, the oxidant gas stream is air preheated to 550° C. Higher preheat temperatures, as described above, are advantageously achieved using commercially available heating equipment. In the deep fuel rich off-gas processes, enhancement oxygen is added to the air to yield oxygen percents shown in Table 1. It can been seen that raw material costs rise with increasing amount of enhancement oxygen. In Tables 1 (and in Table 2) the raw material costs (RMC) are shown in values normalized against the raw material costs for control run "NG." Thus, the raw material costs for control example "NG" is shown as 100% and, for example, the raw material costs for DROG-4 (run at a primary combustion rate of seventy-eight percent (78%)) is seen to be use of supplemental combustion fuel, for example natural gas, etc. and/or additional heating of the off-gas, oxidant gas stream, hydrocarbon feedstock and even the combustion gases produced in the burner, especially through the use of electricity, for example in a plasma heating unit, can facilitate the use of a carbon black furnace's own off-gas. Such additional flexibility, together with the added control over product qualities, will in certain preferred embodiments justify the somewhat higher raw material costs, especially since raw material costs are substantially reduced in accordance with preferred embodiments of the present invention.

TABLE 1

Control Process Employing Natural Gas and Off-Gas Processes

| | NG (Control) | DFROG-1 | DFROG-2 | DFROG-3 | DFROG-4 | FROG-5 |
|---|---|---|---|---|---|---|
| Oxygen % | 20.95 | 28.11 | 24.40 | 21.93 | | |
| Primary Combustion Ratio | 125 | 65 | 70 | 75 | 78 | 85 |
| Raw Material Costs % | 100 | 74.3 | 72.4 | 70.6 | 69.9 | 72.9 | only 69.6% of the comparable raw material costs for control example "NG." In each of the four deep fuel rich off-gas processes and in the FROG-5 process, the raw material cost is seen to be substantially less than the raw material cost of the natural gas process. The primary combustion ratio is shown for each of the five processes. The natural gas is run fuel lean, at a primary combustion ratio of 125, whereas the deep fuel rich off-gas processes have a primary combustion rate ranging from sixty-five (65) to seventy-eight (78) percent of stoichiometric and the FROG-5 process has a rate of eight-five percent (85%). The off-gas employed in the deep fuel rich off-gas processes, in each case, was preheated to a temperature of 550° C. by means of electrical heating elements. The calculated processes assumed a natural gas price of US$0.10 per cubic normal meter ($Nm_3$). An oxygen price of US$0.06/$Nm_3$, and make hydrocarbon feedstock price of $0.11/Kg and an electricity price of US$0.045/KWh. Those skilled in the art will recognize that different prices will generate different optimum operating conditions; at the assumed prices Table 1 below clearly shows that use of dewatered, heated off-gas in a deep fuel rich combustion strategy without supplementary combustion gas feed stream results in the lowest raw material costs for making a given grade and throughput of carbon black. It should be recognized, that further increased yield could be achieved by stripping carbon dioxide from the off-gas. In this regard, however, successful economics are shown for using off-gas as a combustion gas feed stream to the burner of a carbon black furnace without incurring the capital and operating costs of a carbon dioxide stripping operation. In general, such costs may outweigh the potential higher yield that a lower carbon dioxide content might generate.

It is an advantage of a least certain preferred embodiments, that oxygen enhancement of the oxidant gas stream to the burner can be employed to increase produce throughput, as, well as providing additional control of carbon black quality, including surface area and structure. Thus, notwithstanding the somewhat higher raw material costs shown in Table 1, the of use oxygen enhancement to the oxidant gas stream, in accordance with certain preferred embodiments, provides significant additional commercial advantage. Likewise, in lieu of or in addition to the use of oxygen enhancement, the Table 2 below shows a pilot plant experiment comparison of three furnace carbon black producing processes. The first two employ natural gas as the combustion gas feed stream. The process "NG Lean" employed natural as in a fuel lean combustion strategy. And the process "NG Deep Rich" employed natural as in a deep fuel rich combustion strategy at 70% and the process "OG Dee Fuel Rich" employed heated, dewatered (to 5% $H_2O$) off-gas (from which the carbon black was substantially removed in accordance with principles of the invention disclosed above) employed in a deep fuel rich combustion strategy at 75%. The NG Deep Rich process was a deep fuel rich process for purposes of comparison. In Table 2 below, OC is the overall combustion level. In each case N339 type carbon black was produced.

TABLE 2

Pilot Plant Experimental Comparison

To Make a N339 Type Carbon Black

| Variable | Units | NG Lean | NG Deep Fuel Rich | OG Deep Fuel Rich |
|---|---|---|---|---|
| PC | % | 156 | 70 | 75 |
| OC | % | 29.0 | 37.0 | 30.5 |
| Air | $Nm_3/h$ | 1000 | 1000 | 1000 |
| Air Temp. | ° C. | 577 | 577 | 577 |
| Oxygen % | In Air | 20.9 | 20.9 | 25.1 |
| Oxygen | $Nm_3/h$ | 0 | 0 | 55 |
| Gas | $Nm_3/h$ | 65 | 146 | 1563 |
| GasTemp. | ° C. | 15 | 15 | 577 |
| Oil | kg/h | 280 | 127 | 245 |
| Oil Temp. | ° C. | 150 | 150 | 150 |
| RMC % | c/kg | 100 | 149.4 | 77.3 |

It can been seen that raw material costs are substantially reduced for the deep fuel rich off-gas process in accordance with the present invention, in comparison to the processes employing natural gas as the feed stream to the burner. Notably, this is achieved notwithstanding the use of the oxygen enhancement in the oxidant gas stream to the burner. It is also noteworthy that the off-gas was preheated to a temperature of 577° C. in the accordance with the principles of the invention disclosed above. Also, quite advantageously, the lower raw material costs were achieved in the deep fuel rich off-gas process of the invention shown in Table 2, while simultaneously achieving significantly higher yield than was achieved in either of the natural gas processes. Specifically, the OG Deep Fuel Rich process higher was 19.7% greater than that of the NG lean process, and was substantially greater than the yield of the NG Deep Rich process. Thus, higher yield and reduced material costs were achieved in comparison to natural gas processes, to produce substantially the same carbon black product.

It will be readily appreciated by those skilled in the art, in view of the present disclosure, that significant benefit is achieved through the use of plasma heating as disclosed here, e.g., plasma heating of recycled off-gas and/or off-gas recycling (here, again, the term recycling meaning use in the same or different carbon black furnace), rather than burning in flairs or incinerators. Due to the higher carbon black yields, certain embodiments of the process employ less hydrocarbon feedstock.

From the foregoing discussion, it will be understood by those skilled in the art that significant advantage is achieved by the invented subject matter disclosed herein. Various modification and additions to the furnace carbon black producing processes disclosed above will be apparent to those skilled in the art given the benefit of this disclosure. Also its modifications and additions which fall within the true scope and spirit of the disclosure are considered to be within scope of the invention and covered by the claims which follow below.

We claim:

1. A furnace carbon black producing process comprising the steps of:
   (a) obtaining off-gas from a carbon black furnace,
   (b) dewatering and heating the off-gas and substantially removing any existing carbon black therefrom to obtain dewatered and heated off-gas, and then
   (c) feeding a combustion gas feed stream comprising the dewatered and heated off-gas and feeding an oxidant gas stream comprising an oxidant gas to a burner portion of a carbon black furnace, wherein the carbon black furnace to which the combustion gas feed stream and oxidant gas feed stream are selectively fed is a different carbon black furnace from the carbon black furnace of step (a), wherein the carbon black furnace to which the combustion gas feed stream and oxidant gas feed stream are fed comprises said burner portion wherein a combustion gas feed stream is combusted in the presence of an oxidant gas feed stream to produce hot combustion gases and a reactor portion downream of said burner portion wherein the hot combustion gases interact with a hydrocarbon feedstock to produce carbon black,
   (d) controlling the combustion gas feed stream and oxidant gas feed stream so that combustion of the combustion gas feed in the burner portion to produce hot combustion gases takes place in a fuel-rich condition so that the combustion gas feed stream does not completely combust in the burner portion, and
   (e) producing carbon black in the reactor portion of the carbon black furnace by interaction of the hot combustion gases with a hydrocarbon feedstock under said fuel rich conditions.

* * * * *